United States Patent
Genzel et al.

(10) Patent No.: US 8,035,341 B2
(45) Date of Patent: Oct. 11, 2011

(54) STAGED DEPLOYMENT FOR ELECTRICAL CHARGE SPOTS

(75) Inventors: Eran Genzel, Oranit (IL); Avner Sadot, Tel Aviv (IL); Shaul Hanuna, Tel Aviv (IL); Dalit Bahar, Tel Aviv (IL)

(73) Assignee: Better Place GmbH, Zug (CH)

( * ) Notice: Subject to any disclaimer, the term of this patent is extended or adjusted under 35 U.S.C. 154(b) by 0 days.

(21) Appl. No.: 12/834,743

(22) Filed: Jul. 12, 2010

(65) Prior Publication Data

US 2011/0140657 A1 Jun. 16, 2011

(51) Int. Cl.
*H02J 7/00* (2006.01)
*B60K 1/00* (2006.01)

(52) U.S. Cl. ........ 320/109; 320/107; 320/125; 180/65.1

(58) Field of Classification Search .................. 320/109, 320/104, 103, 110, 107, 125, 124; 180/65.1
See application file for complete search history.

(56) References Cited

U.S. PATENT DOCUMENTS

| | | | |
|---|---|---|---|
| 3,197,830 A | 8/1965 | Hoadley | |
| 3,690,397 A | 9/1972 | Parker | 180/65 |
| 3,799,063 A | 3/1974 | Reed | 104/34 |
| D235,555 S | 6/1975 | Plummer | D26/5 R |
| D237,718 S | 11/1975 | Bozich | D26/12 |
| 4,052,655 A | 10/1977 | Vizza | 320/2 |
| 4,102,273 A | 7/1978 | Merkle et al. | 104/34 |
| 4,309,644 A | 1/1982 | Reimers et al. | 318/139 |
| 4,338,587 A | 7/1982 | Chiappetti | 340/32 |
| 4,347,472 A | 8/1982 | Lemelson | 320/2 |
| 4,352,992 A | 10/1982 | Buennagel et al. | 307/40 |
| 4,365,681 A | 12/1982 | Singh | 180/68.5 |
| 4,383,210 A | 5/1983 | Wilkinson | 320/2 |
| 4,404,641 A | 9/1983 | Bazarnik | 364/569 |
| D270,831 S | 10/1983 | Jensen | D13/40 |
| D274,126 S | 6/1984 | Flies | D8/347 |

(Continued)

FOREIGN PATENT DOCUMENTS

DE 3439038 A1 10/1984

(Continued)

OTHER PUBLICATIONS

Heavy Duty Connectors, May 13, 2010, 5 pgs. www.weidmuller.com (http://www.weidmuller.com).

(Continued)

*Primary Examiner* — Edward Tso
*Assistant Examiner* — Alexis Boateng
(74) *Attorney, Agent, or Firm* — Morgan, Lewis & Bockius LLP

(57) ABSTRACT

A method and system is provided to deploy electrical charge spots in stages according to demand. During a first stage a plurality of infrastructure adapters are installed. This may involve demolishing and rebuilding portions of the infrastructure and laying down power cables from the electrical power supply to the charge spot locations. The infrastructure adapters are then coupled to an electrical power supply. Many if not all of the infrastructure adapters are covered with a temporary housing protecting them from vandalism and weather. During a second stage, in response to a demand for charge stations, the charge stations are completed. During the second stage, at least one external unit is attached to an infrastructure adapter by making an infrastructure adapter quick connect interface with an external unit quick connect interface. As such, a charge spot is completed quickly in response to demand.

20 Claims, 10 Drawing Sheets

U.S. PATENT DOCUMENTS

| | | | |
|---|---|---|---|
| 4,532,418 A | 7/1985 | Meese et al. | 235/381 |
| 4,532,511 A | 7/1985 | Lemelson | 340/933 |
| D286,040 S | 10/1986 | LaValle | D13/24 |
| D286,854 S | 11/1986 | Fane et al. | D8/347 |
| 4,709,202 A | 11/1987 | Koenck et al. | 320/43 |
| 4,789,047 A | 12/1988 | Knobloch | 184/1.5 |
| 4,791,871 A | 12/1988 | Mowll | 104/94 |
| 4,800,328 A | 1/1989 | Bolger et al. | 320/2 |
| D299,821 S | 2/1989 | Dively | D13/31 |
| 4,846,697 A | 7/1989 | Rodgers | 439/35 |
| 4,861,971 A | 8/1989 | Chan | 235/384 |
| 4,876,513 A | 10/1989 | Brilmyer et al. | 324/427 |
| 4,876,540 A | 10/1989 | Berthon et al. | 340/932.2 |
| 4,880,097 A | 11/1989 | Speas | 194/239 |
| D307,580 S | 5/1990 | Reali | D13/133 |
| D308,267 S | 5/1990 | Bradd | D32/31 |
| 4,960,150 A | 10/1990 | Ryan | 137/234.6 |
| 4,967,895 A | 11/1990 | Speas | 194/200 |
| D314,182 S | 1/1991 | Moerman | D13/152 |
| 5,003,476 A | 3/1991 | Abe | 364/424.03 |
| 5,003,520 A | 3/1991 | Grieu et al. | 368/90 |
| 5,049,802 A | 9/1991 | Mintus et al. | 320/2 |
| 5,058,044 A | 10/1991 | Stewart et al. | 364/551.01 |
| 5,072,380 A | 12/1991 | Randelman et al. | 364/406 |
| 5,091,856 A | 2/1992 | Hasegawa et al. | 364/424.05 |
| 5,151,865 A | 9/1992 | Blessing et al. | 364/483 |
| 5,157,319 A | 10/1992 | Klontz et al. | 320/2 |
| 5,159,272 A | 10/1992 | Rao et al. | 324/429 |
| 5,184,058 A | 2/1993 | Hesse et al. | 320/4 |
| 5,189,836 A | 3/1993 | Alder et al. | 49/33 |
| 5,202,617 A | 4/1993 | Nor | 320/2 |
| 5,206,578 A | 4/1993 | Nor | 320/14 |
| 5,229,704 A | 7/1993 | Knepper | 320/2 |
| 5,230,637 A | 7/1993 | Weber | 439/504 |
| 5,263,565 A | 11/1993 | Wilkinson | 194/216 |
| 5,297,664 A | 3/1994 | Tseng et al. | 194/217 |
| 5,306,999 A | 4/1994 | Hoffman | 320/2 |
| 5,315,227 A | 5/1994 | Pierson et al. | 320/2 |
| D349,099 S | 7/1994 | Robertson, Jr. et al. | D13/147 |
| 5,327,066 A | 7/1994 | Smith | 320/2 |
| 5,349,535 A | 9/1994 | Gupta | 364/483 |
| 5,350,312 A | 9/1994 | Kuno et al. | 439/310 |
| 5,369,352 A | 11/1994 | Toepfer et al. | 320/56 |
| 5,453,585 A | 9/1995 | Lenz et al. | 191/12.2 R |
| 5,461,299 A | 10/1995 | Bruni | 320/2 |
| 5,462,439 A * | 10/1995 | Keith | 320/109 |
| 5,478,250 A | 12/1995 | Hoffman | 439/142 |
| 5,535,274 A | 7/1996 | Braitberg et al. | 379/446 |
| 5,539,399 A | 7/1996 | Takahira et al. | 340/995 |
| D373,192 S | 8/1996 | Murphy et al. | D24/129 |
| 5,542,488 A | 8/1996 | Nixon | 180/65.1 |
| 5,545,046 A | 8/1996 | Masuda et al. | 439/142 |
| 5,563,491 A | 10/1996 | Tseng | 320/2 |
| 5,568,390 A | 10/1996 | Hirota et al. | 364/449 |
| 5,573,090 A | 11/1996 | Ross | 191/10 |
| 5,585,205 A | 12/1996 | Kohchi | 429/99 |
| 5,590,749 A | 1/1997 | Wagner et al. | 191/12.4 |
| 5,612,606 A | 3/1997 | Guimarin et al. | 320/2 |
| 5,614,808 A | 3/1997 | Konoya et al. | 320/48 |
| 5,627,448 A | 5/1997 | Okada et al. | 320/2 |
| 5,627,752 A | 5/1997 | Buck et al. | 364/424.04 |
| 5,631,536 A | 5/1997 | Tseng | 320/15 |
| 5,644,209 A | 7/1997 | Chabbert et al. | 320/15 |
| 5,656,916 A | 8/1997 | Hotta | 320/22 |
| 5,696,367 A * | 12/1997 | Keith | 235/381 |
| 5,701,706 A | 12/1997 | Kreysler et al. | 52/169.6 |
| 5,703,461 A | 12/1997 | Minoshima et al. | 320/2 |
| 5,711,648 A | 1/1998 | Hammerslag | 414/786 |
| 5,742,229 A | 4/1998 | Smith | 340/438 |
| 5,758,414 A | 6/1998 | Ehrenfels | 29/857 |
| 5,815,824 A | 9/1998 | Saga et al. | 701/22 |
| 5,821,731 A | 10/1998 | Kuki et al. | 320/108 |
| 5,822,427 A | 10/1998 | Braitberg et al. | 379/454 |
| 5,903,064 A | 5/1999 | Norberg | 307/40 |
| 5,906,500 A | 5/1999 | Kakuta et al. | 439/310 |
| 5,913,917 A | 6/1999 | Murphy | 701/123 |
| 5,927,938 A | 7/1999 | Hammerslag | 414/809 |
| 5,951,229 A | 9/1999 | Hammerslag | 414/398 |
| D415,111 S | 10/1999 | Lee | D13/154 |
| 5,979,605 A | 11/1999 | Popp | 187/205 |
| 5,998,963 A | 12/1999 | Aarseth | 320/109 |
| 6,002,396 A | 12/1999 | Davies | 345/339 |
| 6,014,597 A | 1/2000 | Kochanneck | 701/22 |
| D420,644 S | 2/2000 | Nemser et al. | D13/146 |
| 6,088,963 A | 7/2000 | Cawthon et al. | 49/33 |
| 6,094,028 A | 7/2000 | Gu et al. | 320/109 |
| D429,622 S | 8/2000 | Bickle | D8/347 |
| 6,114,632 A | 9/2000 | Planas, Sr. et al. | 174/117 R |
| 6,123,569 A | 9/2000 | Fukushima et al. | 439/456 |
| D434,001 S | 11/2000 | Sayger | D13/139.5 |
| 6,177,879 B1 | 1/2001 | Kokubu et al. | 340/825.33 |
| 6,204,505 B1 | 3/2001 | Call | 250/370.01 |
| 6,240,684 B1 | 6/2001 | Bigelow | 52/174 |
| 6,371,768 B1 | 4/2002 | Neblett et al. | 439/34 |
| 6,388,564 B1 | 5/2002 | Piercy et al. | 340/310.01 |
| 6,487,477 B1 | 11/2002 | Woestman et al. | 701/22 |
| 6,539,678 B1 | 4/2003 | Campbell et al. | 52/169.7 |
| 6,727,809 B1 | 4/2004 | Smith | 340/438 |
| 6,909,287 B2 | 6/2005 | Bertness | 324/427 |
| D515,033 S | 2/2006 | Petrick et al. | D13/139.4 |
| 7,003,411 B2 | 2/2006 | Bertness | 702/63 |
| D517,591 S | 3/2006 | Kokido | D17/9 |
| D522,963 S | 6/2006 | Hayes et al. | D13/108 |
| 7,090,521 B2 | 8/2006 | Nishio et al. | 439/248 |
| 7,158,008 B2 | 1/2007 | Waring et al. | 340/5.66 |
| 7,201,384 B2 | 4/2007 | Chaney | 280/68.5 |
| 7,256,516 B2 | 8/2007 | Buchanan et al. | 307/62 |
| D559,785 S | 1/2008 | Tosetti | D13/147 |
| 7,400,113 B2 | 7/2008 | Osborne | 320/118 |
| 7,411,371 B2 | 8/2008 | Hobbs | 320/128 |
| 7,444,192 B2 | 10/2008 | Dickinson et al. | 700/83 |
| 7,602,143 B2 * | 10/2009 | Capizzo | 320/109 |
| D607,831 S | 1/2010 | Andre et al. | D13/154 |
| 7,826,941 B2 | 11/2010 | Hayashi et al. | 701/22 |
| 2001/0002789 A1 | 6/2001 | Terazoe | 320/108 |
| 2002/0026252 A1 | 2/2002 | Wruck et al. | 700/90 |
| 2003/0209375 A1 | 11/2003 | Suzuki et al. | 180/65.3 |
| 2004/0044452 A1 | 3/2004 | Bauer et al. | 701/33 |
| 2005/0032404 A1 | 2/2005 | Furuta et al. | 439/157 |
| 2005/0138432 A1 | 6/2005 | Ransom et al. | 713/201 |
| 2005/0162172 A1 | 7/2005 | Bertness | 324/426 |
| 2006/0028171 A1 | 2/2006 | Marraffa | 320/109 |
| 2006/0149459 A1 | 7/2006 | Matsuura et al. | 701/201 |
| 2006/0185756 A1 | 8/2006 | Sato et al. | 141/94 |
| 2006/0229806 A1 | 10/2006 | Forlenza et al. | 701/207 |
| 2006/0277882 A1 | 12/2006 | Berger et al. | 56/10.2 J |
| 2007/0113921 A1 | 5/2007 | Capizzo | 141/231 |
| 2007/0241721 A1 | 10/2007 | Weinstein et al. | 320/114 |
| 2008/0258682 A1 | 10/2008 | Li | 320/109 |
| 2008/0315837 A1 | 12/2008 | Elder et al. | 320/134 |
| 2009/0011639 A1 | 1/2009 | Ballard et al. | 439/607 |
| 2009/0024232 A1 | 1/2009 | Dickinson et al. | 700/89 |
| 2009/0313098 A1* | 12/2009 | Hafner et al. | 705/14.1 |
| 2010/0001689 A1* | 1/2010 | Hultman et al. | 320/114 |
| 2010/0145717 A1 | 6/2010 | Hoeltzel | 705/1.1 |
| 2010/0237985 A1* | 9/2010 | Landau-Holdsworth et al. | 340/5.8 |
| 2010/0280702 A1 | 11/2010 | Artus | 701/30 |
| 2010/0286938 A1 | 11/2010 | Kaneko | 702/63 |
| 2011/0050164 A1* | 3/2011 | Partovi et al. | 320/108 |
| 2011/0066515 A1* | 3/2011 | Horvath et al. | 705/17 |

FOREIGN PATENT DOCUMENTS

| | | |
|---|---|---|
| DE | 10338279 A1 | 3/2005 |
| EP | 0047089 A1 | 3/1982 |
| EP | 0233638 A2 | 8/1987 |
| EP | 0476405 A1 | 3/1992 |
| EP | 0548748 A1 | 6/1993 |
| EP | 0551080 A2 | 7/1993 |
| EP | 0599528 A2 | 6/1994 |
| EP | 0644625 A2 | 3/1995 |
| EP | 0692849 A1 | 1/1996 |
| EP | 1170609 A2 | 1/2002 |
| EP | 1275936 A2 | 1/2003 |
| FR | 2685547 A1 | 6/1993 |
| FR | 2696139 A1 | 4/1994 |
| FR | 2721559 A1 | 12/1995 |

| | | | |
|---|---|---|---|
| FR | 2737694 A1 | 2/1997 | |
| GB | 1377729 | 12/1974 | |
| GB | 2219151 A | 11/1989 | |
| GB | 2253379 A | 9/1992 | |
| JP | 2004-331020 | 11/2004 | |
| JP | 2006-113892 | 4/2006 | |
| WO | WO 93/02887 A1 | 2/1993 | |
| WO | WO 93/08629 A1 | 4/1993 | |
| WO | WO 93/08630 A1 | 4/1993 | |
| WO | WO 94/09544 A1 | 4/1994 | |
| WO | WO 94/11853 A1 | 5/1994 | |
| WO | WO 94/26002 A1 | 11/1994 | |
| WO | WO 94/28526 A1 | 12/1994 | |
| WO | WO 96/01520 A1 | 1/1996 | |
| WO | WO 98/21132 A1 | 5/1998 | |
| WO | WO 2008/073453 A1 | 6/2008 | |
| WO | WO 2008/073470 A2 | 6/2008 | |
| WO | WO 2008/073472 A2 | 6/2008 | |
| WO | WO 2008/073474 A2 | 6/2008 | |
| WO | WO 2008/073476 A2 | 6/2008 | |
| WO | WO 2008/073477 A2 | 6/2008 | |
| WO | WO 2009/109826 A1 | 9/2009 | |
| WO | WO 2009/156780 A1 | 12/2009 | |
| WO | WO 2010/004192 A2 | 1/2010 | |
| WO | WO 2010/015777 A1 | 2/2010 | |
| WO | WO 2010/076457 A1 | 7/2010 | |
| WO | WO 2010/124831 A2 | 11/2010 | |

OTHER PUBLICATIONS

International Preliminary Examination Report for PCT/US08/77132 dated Feb. 22, 2011 5 pgs.
European Search Report EP 08832521 dated Feb. 2, 2011, 5 pgs.
International Search Report and Written Opinion for PCT/US2008/077132 dated Dec. 2008, 8 pgs.
International Search Report and Written Opinion for PCT/US2009/057594 dated Dec. 1, 2009, 9 pgs.
International Search Report and Written Opinion for PCT/US2009/057596 dated Dec. 1, 2009, 10 pgs.
International Search Report and Written Opinion for PCT/2010/048661 dated Dec. 10 2010, 9 pgs.

* cited by examiner

STAGED DEPLOYMENT FOR ELECTRICAL CHARGE SPOTS

RELATED APPLICATIONS

This application is related to application Ser. No. 12/428,932, Filed Apr. 23, 2009, entitled "Electric Vehicle Battery System" and application Ser. No. 12/560,337, filed Sep. 15, 2009, entitled "System and Method for Operating an Electric Vehicle," each of which is incorporated by reference herein in its entirety.

TECHNICAL FIELD

The disclosed embodiments relate generally to electric vehicle charge spots. In particular, the disclosed embodiments relate to an expandable system for deploying and replacing of electric vehicle charge spots by means of a fast connector.

BACKGROUND

Vehicles (e.g., cars, trucks, planes, boats, motorcycles, autonomous vehicles, robots, forklift trucks, etc.) are an integral part of the modern economy. Unfortunately, fossil fuels, like gasoline which is typically used to power such vehicles, have numerous drawbacks including: a dependence on limited sources of fossil fuels; foreign sources of fossil fuels are often in volatile geographic locations; and such fuels produce pollution and likely climate change. One way to address these problems is to increase the fuel economy of these vehicles. Recently, gasoline-electric hybrid vehicles have been introduced, which consume substantially less fuel than their traditional internal combustion counterparts, i.e., they have better fuel economy. However, gasoline-electric hybrid vehicles do not eliminate the need for fossil fuels, as they still require an internal combustion engine in addition to the electric motor.

Another way to address this problem is to use renewable resource fuels such as bio-fuels. Bio-fuels, however, are currently expensive and years away from widespread commercial use.

Yet another way to address these problems is to use clean technologies, such as electric motors powered by fuel cells or batteries. These batteries need to be recharged relatively often. For example they might require re-charging in a parking garage of a store or office building. Therefore, many charge stations may be required. As more and more vehicles use rechargeable fuel cells or batteries, more and more charge spots will be necessary. However, connecting each charge spot to an electric power grid can be costly and time consuming. Furthermore, the deployment often requires an operator with specialized skills. Similarly, if the charge spot malfunctions or is vandalized, replacement of the charge spot is also costly, time consuming, and requires specialized operator skill.

It would be beneficial if there were a system that could quickly deploy more charge spots as demand grows. It would also be beneficial if the deployment did not require an operator with specialized skills. Furthermore, it would be beneficial if charge spots could be quickly and easily replaced when necessary.

SUMMARY

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

In order to overcome the above described drawbacks, a network of charge spot infrastructure adapters is deployed during a first stage. This first stage involves connecting the infrastructure adapters to a main power grid, which may include removing walls, digging, etc. Then in some embodiments, many of the adapters are covered for protection until they are required. During a second stage at least some of the infrastructure adapters are coupled to external units to create complete charge spots. As the demand for charge spots increases, more external units are coupled to the infrastructure adapters. The adapter includes an interface that easily mates an interface on the external units. The interfaces are universal such that any external unit can be mated to any adapter. Thus, the system can easily expand in response to demand until all of the adapters have been connected to external units. Furthermore, because of the universal interfaces, the external units are quick and easy to install and replace.

Specifically, the present invention overcomes the limitations and disadvantages described above by providing methods and systems for deployment of an electrical charge spot system for charging at least partially electric vehicles in stages. During a first stage, one or more infrastructure adapters are installed. Each infrastructure adapter comprises a power supply electrical interface and an adapter quick connect interface. The power supply electrical interface of the infrastructure adapter is coupled to a power supply. During a second stage one or more external units is installed. Each external unit comprises a car electrical connector, configured to temporarily electrically connect to and charge an at least partially electric vehicle. Each external unit also comprises an external unit quick connect interface, configured to removably mate to the adapter quick connect interface. An external unit quick connect interface of a respective external unit of the one or more external units is mated to an adapter quick connect interface of a respective infrastructure adapter of the one or more infrastructure adapters. In some embodiments, the mating forming a high voltage electrical connection between the external unit quick connect interface and the adapter quick connect interface. In some embodiments, the mating occurs in under 5 minutes. In some embodiments the mating occurs with no additional wiring required.

In some embodiments, each infrastructure adapter further comprises a data connector and an adapter data interface. Furthermore, each external unit further comprises an external unit data interface. During the first stage, the data connector of the infrastructure adapter is coupled to a data network. Furthermore, during the second stage, the external unit data interface is mated to an adapter data interface.

In some embodiments, the method further comprises, ascertaining a unique geographic location for the respective infrastructure adapter during a first stage. Then during the unique geographic location is stored in a memory associated with the respective infrastructure adapter as at least a portion of a geographic ID. Then during a second stage the unique geographic ID is communicated from the infrastructure adapter to the respective external unit. Some embodiments further provide communicating the unique geographic ID to a service provider.

In some embodiments, the method further comprises during a third stage, temporarily coupling a vehicle charging interface portion of the car electrical connector to an at least partially electric vehicle and enabling power to flow from the power supply to the vehicle through the power supply electrical interface, the adapter quick connect interface, the external unit quick connect interface, and the car electrical connector.

In some embodiments, the method further comprises during a third stage, communicating charging information associated with the power flowing from the power supply to the electric vehicle, from the charge spot system to a service provider, via the power supply electrical interface. Alternatively, in some embodiments, the method further comprises during a third stage, communicating charging information associated with the power flowing from the power supply to the electric vehicle, from the charge spot system to a service provider, via a wireless communication device in the charge spot system.

In some embodiments, the method further comprises during a third stage, replacing the respective external unit with a new external unit, by decoupling the external unit quick connect interface of the respective external unit from the adapter quick connect interface of the respective infrastructure adapter, and removably coupling an external unit quick connect interface of the new external unit to the adapter quick connect interface of the respective infrastructure adapter. In some embodiments, the third stage also comprises communicating a unique geographic ID from the infrastructure adapter to the new external unit.

In some embodiments, the method further comprises during a third stage, installing one or more additional external units by removably coupling one or more external unit quick connect interfaces of the one or more additional external units to one or more adapter quick connect interfaces of previously unused infrastructure adapters of the one or more infrastructure adapters. In some embodiments, the third stage occurs in response to an increase in demand for charge spots.

In some embodiments, the second stage installing includes installing a charge spot shell. In some embodiments, the first stage installing includes covering the infrastructure adapter with a temporary housing.

Some embodiments provide an electrical charge spot system having one or more charge spots for charging an at least partially electric vehicle. The charge spots include an infrastructure adapter configured to removably connect to an external unit. The infrastructure adaptor includes memory storing information related to the geographic location of the infrastructure adapter, an adapter quick connect interface, a power supply electrical interface, and a data connector. The adapter quick connect having power connectors, data connectors, and a signaling interface configured to communicate the information to the external unit. The power supply interface is electrically coupled to the power connectors and configured to be coupled to an external power supply. The data connector is electrically coupled to the data connectors and configured to be coupled to a data network. The external unit includes an external unit quick connect interface configured to removably connect to the adapter quick connect interface, and a car electrical connector electrically coupled to the external unit quick connect interface and configured to temporarily connect to and charge an at least partially electric vehicle.

The external unit is removably mated to the infrastructure adapter through their respective quick connect interfaces. In some embodiments, the electrical charge spot system includes the at least one charge spot that is mounted to a wall, a ceiling, or a floor.

In some embodiments, the infrastructure adapter is configured to be coupled to the power supply according to location specific requirements of an infrastructure. But the external unit is generic and is configured to couple to the infrastructure adapter without regard to the specific power supply requirements of the infrastructure.

In some embodiments, the electrical charge spot system includes an adapter guide mechanism and an adapter tolerance mechanism in the infrastructure adapter. Similarly, the external unit includes an external unit guide mechanism and an external unit tolerance mechanism.

In some embodiments, the electrical charge spot system further comprises a memory storing one or more of: a panel geographic ID, a circuit geographic ID, a charge spot geographic ID, and a socket geographic ID.

In some embodiments, the electric charge spot system also comprises an additional infrastructure adapter comprising an adapter quick connect interface, a power supply electrical interface configured to be coupled to a power supply; and a temporary housing covering the infrastructure adapter.

Some embodiments provide an electrical charge spot system comprising one or more charge spots for charging an at least partially electric vehicle. At least one charge spot comprises an infrastructure adapter and an external unit. The infrastructure adapter comprises a means for removably mating to an external unit and a means for coupling to a power supply. The external unit comprises a means for temporarily connecting to and charging an at least partially electric vehicle, and a means for removably mating to the infrastructure adapter.

The advantages of the above described embodiments are numerous. Because the infrastructure of deployment can vary drastically from region to region (e.g. there are different deployment practices and local regulations in different countries), deploying charge spots as entire units would require developing units specific to the infrastructure in which they are deployed. However, according to the above embodiments, only the relatively simple infrastructure adapter needs to be specially designed to comport with the infrastructure. Then the more complicated external device can be a standard component that will easily mate with any infrastructure adapter. As such, the external units can be mass produced to cut down on manufacturing costs. Furthermore, the interfaces between the infrastructure adapter and the external unit are easy to plug into mate together interfaces. They do not require wiring to connect to each other. A relatively un-skilled operator can deploy the external units, and need not use any particular tools save for a simple screwdriver to install an external unit onto an infrastructure adapter.

Additionally, installing infrastructure adapters may require skilled operators to install them. Limiting the number of hours spent by skilled operators is therefore desirable. Infrastructure adapter installation may also require relatively drastic changes to the installation site, such as excavating, installing a conductor in a trench, placing the foundation etc. As such, limiting the number of times that the installation site must be disturbed is highly desirable. Using the methods described herein, a plurality of infrastructure adapters can be installed simultaneously, which cuts down on skilled operator time as well as limiting the time that an infrastructure is disturbed. In fact, it is desirable that more infrastructure adapters are installed than would be necessary for currently needed charge spots. As such, only some of the infrastructure adapters will be connected to external units to make functioning charge spots. The remaining infrastructure adapters will be covered with a temporary housing. At a later date, these infrastructure adapters will be uncovered and attached to additional external units. Installing these additional external units does not affect the already functioning charge spots. As such, more charge spots can be easily and inexpensively added as demand for charge spots increases.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Figure 1:
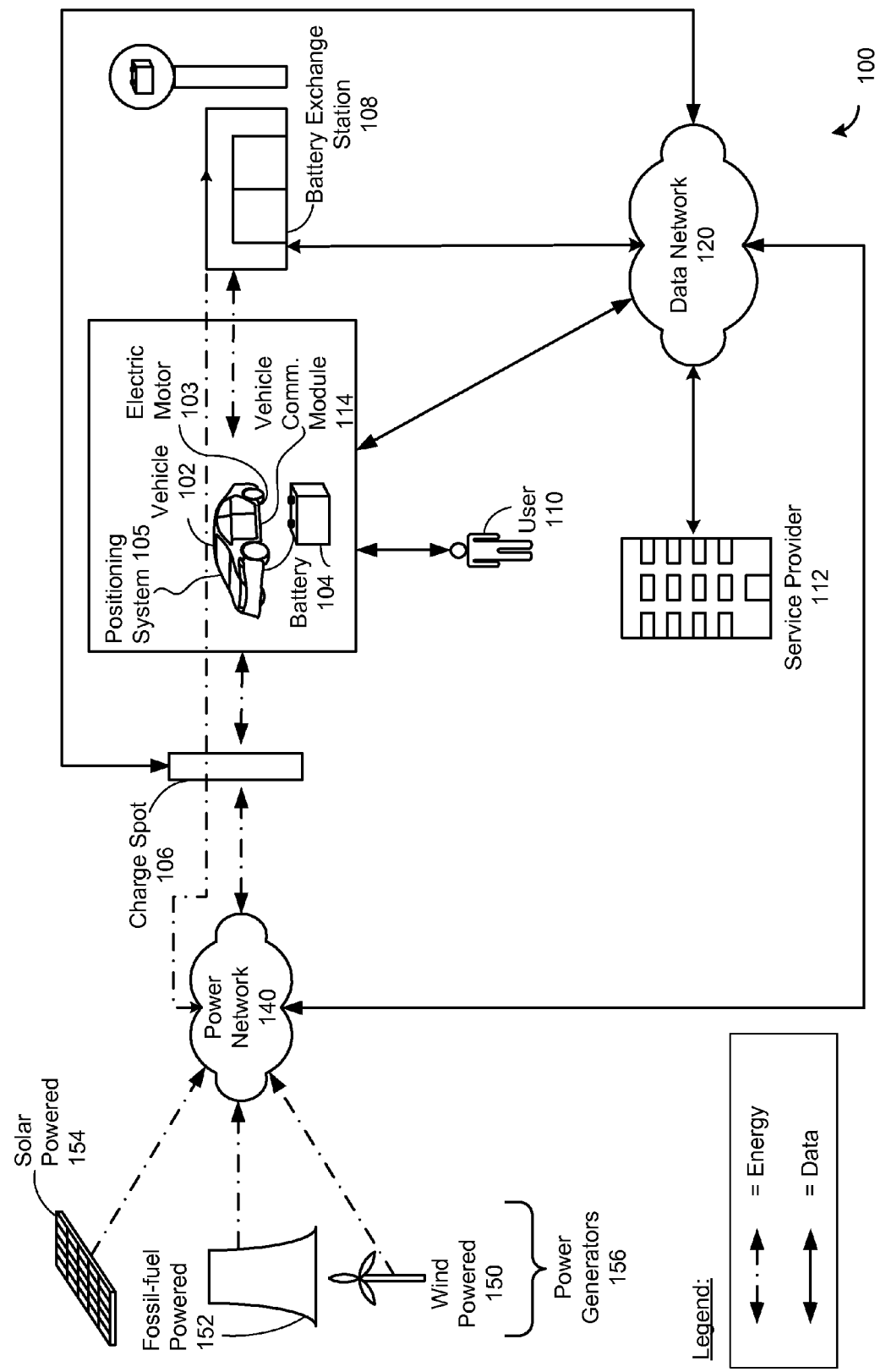
FIG. 1 illustrates an electric vehicle network.

FIG. 1 illustrates an electric vehicle network 100, according to some embodiments. The electric vehicle network 100 includes a vehicle 102 and a battery 104. In some embodiments, the battery 104 includes any device capable of storing electric energy such as batteries (e.g., lithium ion batteries, lead-acid batteries, nickel-metal hydride batteries, etc.), capacitors, reaction cells (e.g., Zn-air cell), etc. In some embodiments, the vehicle 102 includes an electric motor 103 that drives one or more wheels of the vehicle. In these embodiments, the electric motor 103 receives energy from a battery (e.g., the battery 104) that is electrically and mechanically attached to the vehicle (shown separate from the vehicle for the ease of explanation).

In some embodiments, the battery 104 of the vehicle 102 can be charged at a charge spot 106, also known as a charge station. In some embodiments, the charge spots 106 provide energy to the vehicle to charge the battery 104 of the vehicle 102. Charge spots 106 can be placed at locations where vehicles may be parked. For example, the charge stations can be located in parking lots of office buildings or shopping centers and/or near street parking spots. In some embodiments, a charge spot 106 can be located at a home of a user. In some embodiments, the charge spot 106 may charge the battery 104 of the vehicle 102 at different rates. For example, the charge spots 106 may charge the battery 104 of the vehicle 102 using a quick-charge mode or a trickle charge mode.

In some embodiments, the battery 104 of the vehicle 102 can be exchanged for a charged battery at one or more battery exchange stations 108. Thus, if a user 110 is traveling a distance beyond the range of a single charge of the battery 104 of the vehicle, the spent (or partially spent) battery can be exchanged for a charged battery so that the user can continue with his/her travels without waiting for the battery to be recharged.

In some embodiments, the vehicle 102 includes a communication module 114, including hardware and software, that is used to communicate with a service provider 112 of a vehicle-area network. Note that the term "vehicle-area network" is used herein to refer to a network of vehicles, batteries, battery exchange stations, charge stations, and a data network.

In some embodiments, the service provider 112 obtains information about the vehicles and/or the charge spots 106 and battery exchange stations 108 by sending queries through a data network 120 to the vehicle 102, the charge spot 106, and/or the battery exchange station 108. For example, the service provider 112 can query the vehicle 102 to determine a geographic location of the vehicle and a status of a battery of the vehicle. Similarly, the service provider 112 can query the charge spot 106 (and/or the battery exchange station 108) to determine the status of the charge spot 106 (and/or the battery exchange station 108). Similarly, the service provider 112 can query the battery exchange station 106 to determine the status of the battery exchange station 106.

The service provider 112 can also send information and/or commands through the data network to the vehicle 102, the charge spot 106, and/or the battery exchange station 108. For example, the service provider 112 can send information about a status of an account of a user, the locations of battery service stations, and/or a status of the battery exchange stations.

The electric vehicle network 100 shown in FIG. 1 also includes the data network 120 and a power network 140.

The data network 120 may include any type of wired or wireless communication network capable of coupling together computing nodes. This includes, but is not limited to, a local area network, a wide area network, or a combination of networks. In some embodiments, the data network 120 is a wireless data network including: a cellular network, a Wi-Fi network, a WiMAX network, an EDGE network, a GPRS network, an EV-DO network, an RTT network, a HSPA network, a UTMS network, a Flash-OFDM network, an iBurst network, and any combination of the aforementioned networks. In some embodiments, the data network 120 includes the Internet.

As illustrated in FIG. 1, the data network 120 is coupled to the vehicle 102, the service provider 112, the charge spot 106, and the battery exchange station 108. Note that for the sake of clarity, only one vehicle, one battery, one charge station and one battery exchange station is illustrated, but the electric vehicle network 100 may include any number of vehicles, batteries, charge stations, and/or battery exchange stations, etc. Furthermore, the electric vehicle network 100 may include zero or more battery exchange stations. For example, the electric vehicle network 100 may only include charge spots 106. In some embodiments, any of the vehicle 102, the service provider 112, the charge spot 106, and/or the battery exchange station 108 includes a communication module that can be used to communicate with each other through the data network 120.

The power network 140 can include power generators 156, power transmission lines, power substations, transformers, etc., which facilitate the generation and transmission. The power generators 156 may include any type of energy generation plants, such as wind-powered plants 150, fossil-fuel powered plants 152, solar powered plants 154, biofuel powered plants, nuclear powered plants, wave powered plants, geothermal powered plants, natural gas powered plants, hydroelectric powered plants, and a combination of the aforementioned power plants or the like. The energy generated by the one or more power generators 156 may be distributed through the power network 140 to charge spots 106, and/or battery exchange stations 108. The power network 140 can also include batteries such as the battery 104 of the vehicle 102, batteries at battery exchange stations, and/or batteries that are not associated with vehicles. Thus, energy generated by the power generators 156 can be stored in these batteries and extracted when energy demand exceed energy generation.

Figure 2:
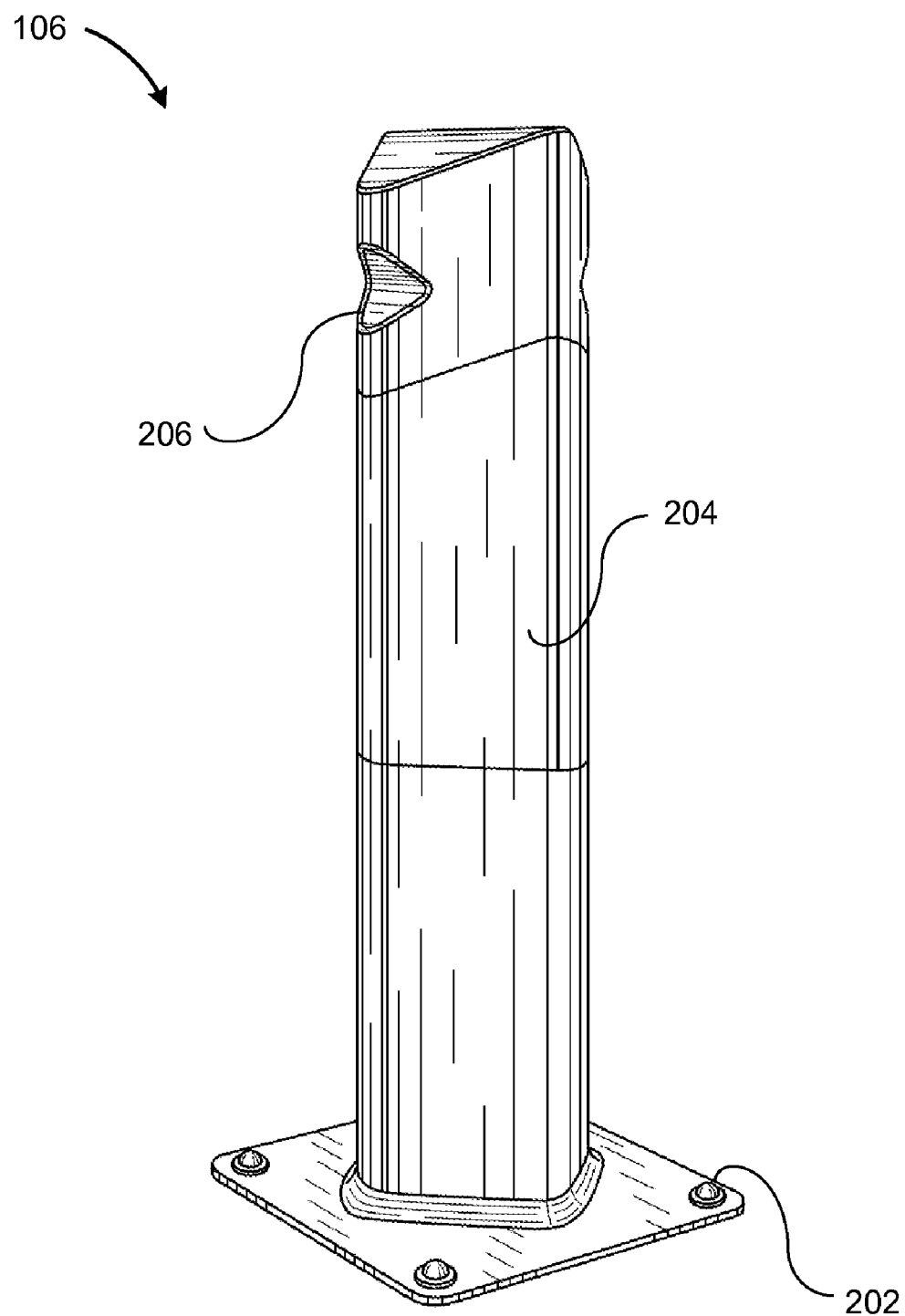
FIG. 2 illustrates a charge spot in accordance with some embodiments of the invention.

FIG. 2 illustrates a charge spot 106 in accordance with some embodiments of the invention. The charge spot 106 includes a shell 204 with one or more vehicle charging interface 206 for connecting the charge spot 106 to the vehicle 102 to charge the battery 104. In some embodiments the vehicle charging interface 206 includes a data communication interface, while in other embodiments it includes only a power interface. In the embodiment shown in FIG. 2, the vehicle charging interface 206 is an outlet designed to interface with a detachable cable. In other embodiments, the vehicle charging interface 206 includes a cable that is permanently attached to the charge spot 106. In some embodiments, the charging interface 206 also includes actuators for locking an inserted cable into the charging interface 206. It should be noted that the charge spot 106 of FIG. 2 is a pole style charge spot, which is mounted to the floor, sidewalk, or ground and houses a variety of internal components. In other embodiments, the charge spot 106 is a wall mounted device or a ceiling mounted device. In other embodiments, the charge spot 106 is a free standing device having a different configuration than the charge spot shown here, such as a box, or a box device located on the top of a pole similar to a parking meter. The charge spot 106 is securely mounted or attached to the ground, a floor, wall, or ceiling such that the charge spot 106 is not easily tampered with or vandalized. The embodiment shown in FIG. 2 includes a plurality of mounting elements 202 to secure the charge spot 106 to the ground or floor.

Figure 3:
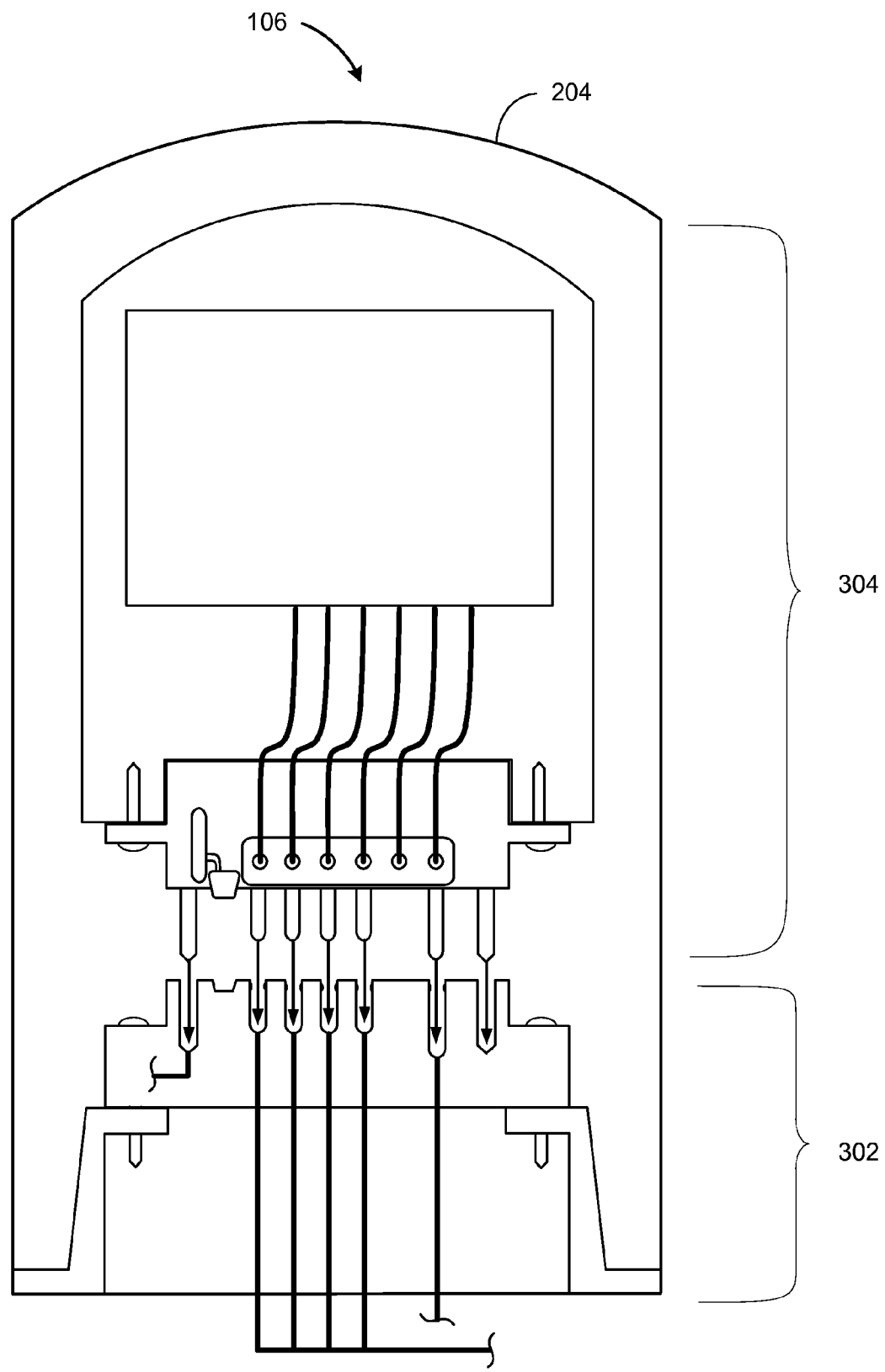
FIG. 3 is an overview of a charge spot's components including an adapter and an external unit in accordance with some embodiments of the invention.

FIG. 3 is an overview of the components of a charge spot 106, including an infrastructure adapter 302 and an external unit 304 in accordance with some embodiments of the invention. In FIG. 3, the external unit 304 is illustrated slightly unplugged from the infrastructure adapter 302 in order to illustrate how the two components would join together, according to the arrows. However, in a fully installed and operating charge spot 106, the external unit 304 and the infrastructure adapter 302 would be mated together. In this embodiment, the infrastructure adapter 302 and the external unit 304 are both above ground and covered by an external shell 204. In other embodiments, the infrastructure adapter 302 is located flush with the ground or wall such that the external shell 204 covers only the external unit 304. The details of the infrastructure adapter 302 are explained with reference to FIG. 4. The details of the external shell 304 are explained with reference to FIGS. 5A-5B.

Figure 4:
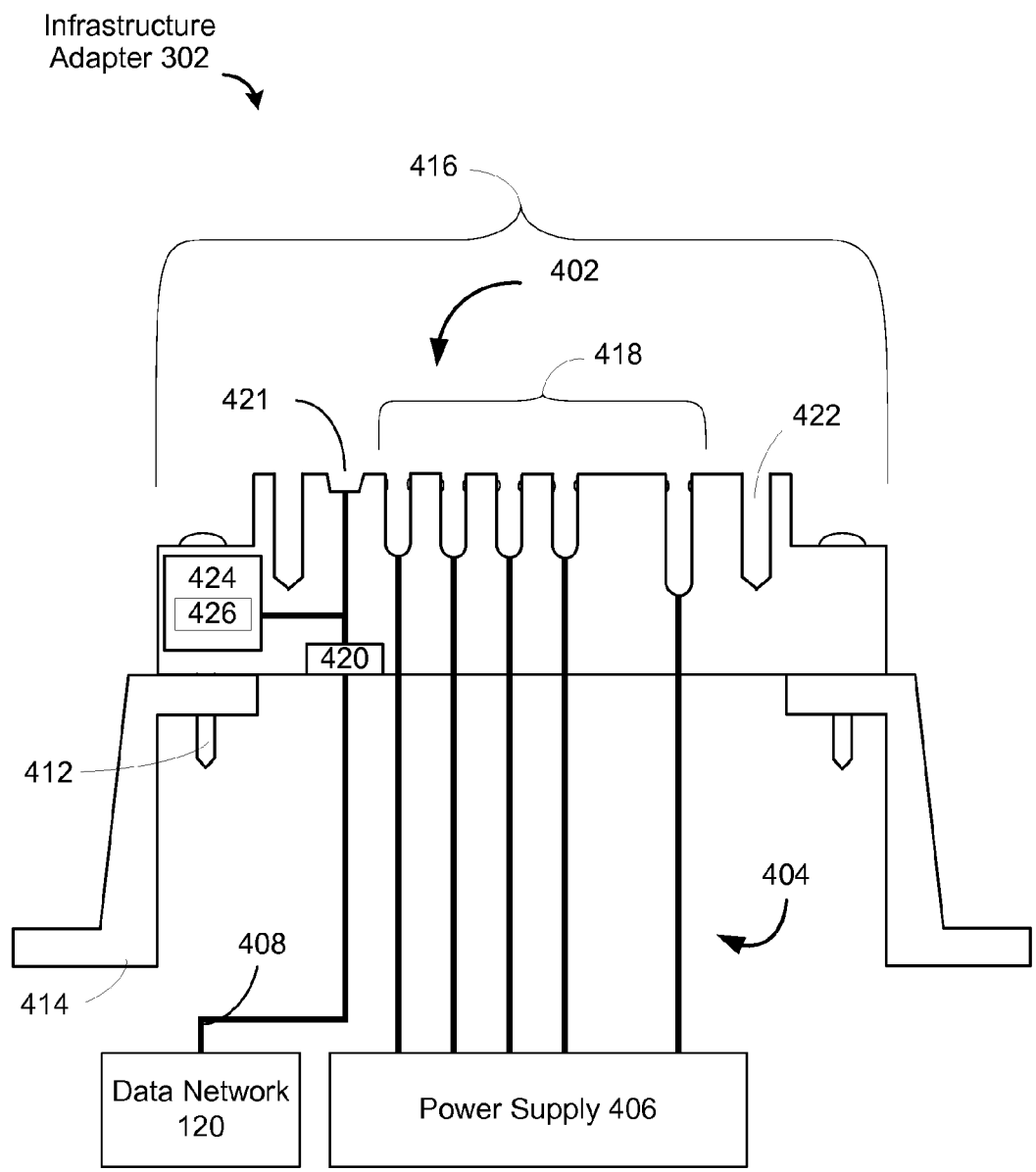
FIG. 4 illustrates an infrastructure adapter in accordance with some embodiments of the invention.

FIG. 4 illustrates an infrastructure adapter 302 of a charge spot 106 in accordance with some embodiments of the invention. The charge spot 106 comprises two distinct components, which are the infrastructure adapter 302 and the external unit 304. In some embodiments, these two components are installed at different times, as will be explained in more detail with respect to FIGS. 6A-6D.

The infrastructure adapter 302 includes a power supply electrical interface 402 for interfacing with the external infrastructure. The power supply electrical interface 402 includes one or more power connectors 404 that interface with an electrical power supply 406. In some embodiments, the electrical power supply 406 is localized such as a local generator, but in most embodiments the power supply 406 is (or is connected to) a local power grid or network 140 (FIG. 1) powered by a variety of power generators 156 (FIG. 1). It should be noted that various countries and regions have different practices for electrical power supplies 406, and therefore the power connectors 404 of the infrastructure adapter 302 are adapted to conform to the particular requirements of the local power supply to which it is attached. Similarly, in some embodiments, the power supply electrical interface 402 also includes wired (or wireless) data connectors 408 that connect to a data network 120. The data connectors 408 are likewise adapted to conform to the particular requirements of the local data network 120. In some instances data may be communicated over the power connectors 404 using Power line communication or power line carrier (PLC), also known as Power line Digital Subscriber Line (PDSL), mains communication, Power Line Telecom (PLT), Power Line Networking (PLN), or Broadband over Power Lines (BPL) technology.

The physical specifications of installation site will also vary from place to place. Thus, the infrastructure adapter 302 includes one or more physical connection elements 412 that interface with the particular setting 414. For example, some infrastructure adapters 302 are installed outside on the street or in a parking lot. Other infrastructure adapters 302 are installed inside in parking garages or structures. Different parking structures vary, with some having round pillars, rectangular pillars, sloping walls, etc., each of which may require a particular type of physical connection element 412 (such as a bracket or fastener). Furthermore, as described with respect to FIG. 2 there are various types of charge spot 106 configurations such as pillar charge spots, wall mounted charge spots, and ceiling mounted charge spots that may each require one or more unique physical connection elements 412 in order to mount securely to the physical geography 414. In some embodiments, the physical infrastructure elements 412 are removable fasteners, as shown in FIG. 4. In other embodiments, the infrastructure adapter 302 is permanently connected to the setting 414 by means of non-removable physical connection elements 412.

Figure 5A:
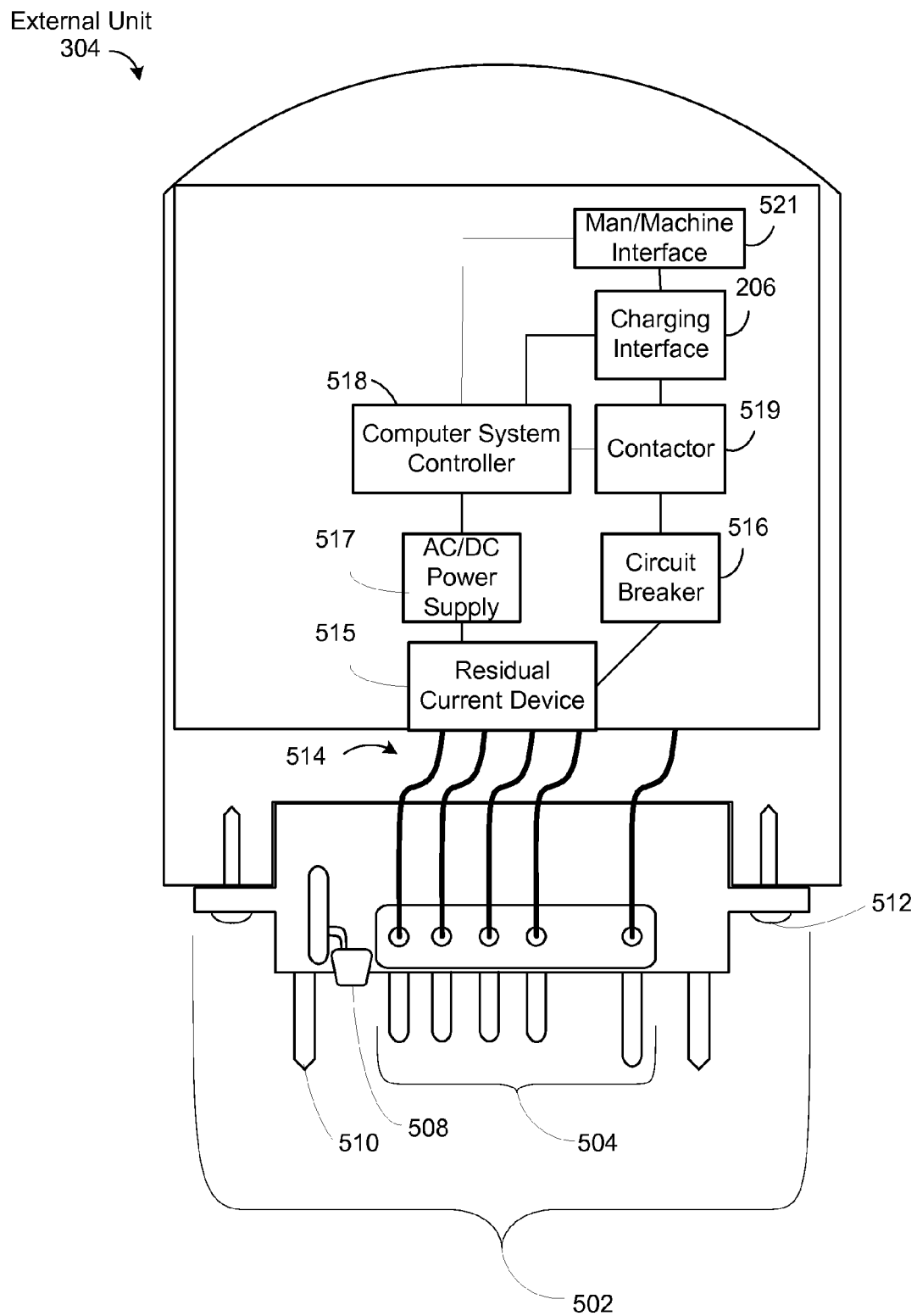
FIGS. 5A-5B illustrates an external unit in accordance with some embodiments of the invention.

The infrastructure adapter 302 also comprises an adapter quick connect interface 416. The adapter quick connect interface 416 is configured to connect to a corresponding interface on the external unit 304, called the external unit quick connect interface 502 (FIG. 5A). The adapter quick connect interface 416 shown in FIG. 4 is a female connector, but in other embodiments the adapter quick connect interface 416 will be a male connector.

The adapter quick connect interface 416 includes an adapter power interface 418. In some embodiments, the adapter power interface 418 includes neutral three phase and ground power interfaces. In some embodiments, the adapter quick connect interface 416 also includes an adapter data interface or transceiver 420. In some embodiments, the adapter data interface/transceiver 420 is hard wired, while in other embodiments the adapter data interface/transceiver 420 is wireless. In some embodiments, the adapter data interface 420 includes a communication connector for long range communications (such as to communicate directly with the data network 120, FIG. 1). In some embodiments, the adapter includes a signaling interface 421 which includes a digital connector for short range communications (such as to communicate with the external unit). In some embodiments, the data interface 420 transfers analog data while the signaling interface 421 sends digital information. In some embodiments, the adapter quick connect interface 416 includes one or more adapter guide mechanisms 422, such as alignment pins or sockets. The adapter guide mechanisms 422 are configured to mate with corresponding pins or sockets in the external unit quick connect interface 502 to align it for connection with the adapter quick connect interface 416 to form good electrical contacts between the electrical and data connectors without damaging them. In some embodiments, the adapter quick connect interface 416 also includes coupling mechanisms designed to compensate for tolerances, relieve potential misalignment, and allow relative motion between the adapter quick connect interface 416 and the external unit quick connect interface 502. In some embodiments, the tolerance mechanisms allow a few millimeters of play in two or more dimensions between the adapter's quick connect interface 416 and the external unit's quick connect interface 502.

In some embodiments, the infrastructure adapter 302 also includes memory 424, which is connected to the signaling interface 421. In some embodiments, the memory 424 stores geographic and/or electrical topology identification information that is unique to the particular infrastructure adapter 302 or component thereof, known as a geographic ID 426. In some embodiments, the geographic ID 426 includes a street address, longitude and latitude coordinates, GPS location, and/or any other identifier of geographic location. The geographic ID 426 is discussed in more detail with respect to FIGS. 6A-6D. In some embodiments, the memory 424 is stored in a central location and includes geographic IDs 426 for each of a plurality of infrastructure adapters 302 connected thereto. For example, a single memory 424 may be utilized by all of the infrastructure adapters 302 on a floor of a parking facility. In some embodiments, each infrastructure adapter 302 includes a CPU and other components. In other embodiments, the CPU and other components are stored in a central location and used by a plurality of infrastructure adapters. In still other embodiments, the infrastructure adapter 302 is passive, and all computing technology for the charge spot 106 is contained in the external unit 304. Thus, the infrastructure adapter's complexity and cost is kept relatively low. It is beneficial in many embodiments to keep the cost of an individual infrastructure adapter 302 significantly lower than the cost of the external unit 304 because in many embodiments more infrastructure adapters 302 are deployed than external units 304. In other words, more infrastructure adapters 302 are initially installed than is required by current demand. As demand increases, external units 304 are connected to those extra infrastructure adapters 302, as is explained in more detail with respect to FIGS. 6A-6D.

By way of summary, the infrastructure adapter 302 includes power, data, and physical connection elements which are specifically designed to interface with the local electrical power, data, and geographic requirements of the place of deployment (i.e., they are designed to connect to the deployment area infrastructure). The infrastructure adapter also includes an adapter quick connect interface 416 for connecting with a number of different external units 304 to form a complete charge spot 106. As such, the infrastructure adapter 302 is optimized for many different deployment locations, while providing a uniform interface for the external unit 304 (and thus for the vehicle).

Figure 5B:
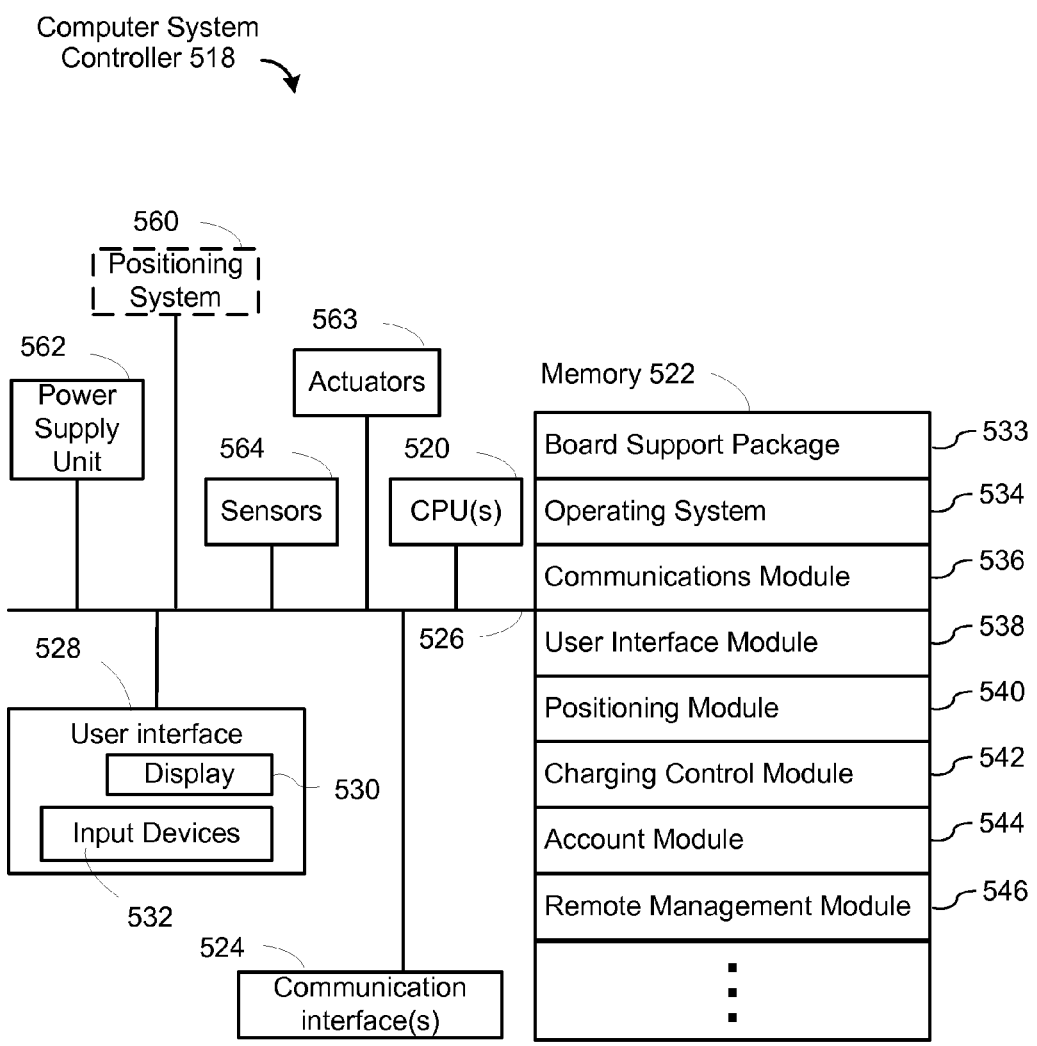

FIGS. 5A-5B illustrate an external unit 304 of a charge spot 106 in accordance with some embodiments of the invention. As stated above, the charge spot 106 comprises two distinct components, which are the infrastructure adapter 302 and the external unit 304, which are often installed at different times as will be explained in more detail with respect to FIGS. 6A-6D.

The external unit 304 comprises an external unit quick connect interface 502. The external unit quick connect interface 502 is configured to connect to adapter quick connect interface 416 shown in FIG. 4. The external unit quick connect interface 502 shown in FIG. 5A is a male interface, but in other embodiments the external unit quick connect interface 502 will be female.

The external unit quick connect interface 502 includes an external unit power interface 504. In some embodiments, the external unit power interface 504 includes neutral three phase and ground interfaces. In some embodiments, the external unit quick connect interface 502 also includes an external unit data interface 508. In some embodiments, the external unit data interface 508 is wired, while in other embodiments the data interface 508 is wireless. In some embodiments, the external unit data interface 508 includes a communication connector for long range communications (such as to communicate directly with the data network 120, FIG. 1). In some embodiments, the external unit includes a digital connector for short range communications (such as to communicate the geographic ID with the infrastructure adapter). In some embodiments, the data interface 508 transfers analog data while the digital connector sends digital information. In some embodiments, the external unit quick connect interface 502 includes one or more external unit guide mechanisms 510 such as alignment pins or sockets. The external unit guide mechanisms 510 are configured to align and mate with the adapter guide mechanisms 422. In some embodiments, the external unit quick connect interface 502 also includes coupling mechanisms designed to compensate for tolerances, relieve potential misalignment, and allow relative motion between the adapter quick connect interface 416 and the external unit quick connect interface 502. In some embodiments, the external unit quick connect interface 502 is coupled to the rest of the external unit 304 by means of removable fasteners 512. In other embodiments, the external unit quick connect interface 502 is integrally formed with other portions of the external unit 304. The external unit quick connect interface 502 also has a car electrical connector 514. The car electrical connector 514 includes a variety of connectors configured to electrically connect to the vehicle charging interface 206 (FIG. 2) for temporarily connecting to and charging the battery of an at least partially electric vehicle 102. The vehicle charging interface 206 is the external portion of the car electrical connectors 514.

In some embodiments the external unit 304 includes a GFCI or residual current device 515 that disconnects the circuit whenever it detects that the electric current is not balanced between the energized conductor and the return neutral conductor for safety and handling reasons. In other embodiments, the residual current device 515 is located elsewhere. The external unit also includes circuit breakers 516. The circuit breakers 516 are configured to protect the internal components of the charge spot and the vehicle from power surges and shorts. The external unit 304 also includes an AC/DC power supply unit 517 and a computer system controller 518 which is shown in detail in FIG. 5B. In some embodiments, the external unit 304 includes an optional contactor or AC switch 519 to turn off an on the AC electricity flowing to the vehicle during charging. In other embodiments, the contactor 519 is located outside the external unit. The external unit also includes a charging interface 206 (such as an outlet or cable) as explained in FIG. 2, for connecting to the vehicle. Furthermore, the external unit may include a man/machine interface 521. In some embodiments, the man/machine interface 521 includes a physical user interface with a screen and keyboard. In other embodiments, the man/machine interface 521 comprises only wireless communication capabilities such as blue tooth, GSM, and RFID. In some embodiments, the external unit also includes one or more meter units (not shown) to control and/or determine the power being sent to the vehicle.

FIG. 5B is a block diagram illustrating the computer system controller 518 of a charge spot 106. In most embodiments, all of the components of the computer system controller 518 are located in the external unit 304 of the charge spot, while in other embodiments at least some of the computer system controller 518 components are located in the infrastructure adapter 302.

The computer system controller 518 typically includes one or more processing units (CPU's) 520. The computer system controller 518 includes one or more network or other communications interfaces 524 that communicate with the contactor 519, the vehicle 102, the infrastructure adapter 302, and/or include direct communication mechanisms (e.g., antennas, I/O interfaces, etc.) The computer system controller 518 includes memory 522, an optional positioning system 560 that determines and/or reports the position of the charge spot 106, a DC/DC power supply unit 562 used to provide power to the computer system and/or other components within the charge spot, sensors 564 that monitor the internal computer system temperature, actuators 563 that lock a charging interface 206 with the vehicle, and one or more communication buses 526 for interconnecting these components.

The charge spot 106 optionally may include a user interface 528 comprising a display device 530 and input devices 532 (e.g., a mouse, a keyboard, a touchpad, a touch screen, etc.). In other embodiments, communications with the charge spot 106 are performed with input devices in the vehicle 102 or are controlled by the service provider 112 via the data network 120 (see FIG. 1).

The memory 522 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 522 may optionally include one or more storage devices remotely located from the CPU(s) 520. For example, in some embodiments, some or all of the components of memory 522 are housed in a central memory that controls a group of charge spots 106. The memory 522, or alternately the non-volatile memory device(s) within memory 522, comprises a computer readable storage medium. In some embodiments, memory 522 stores the following programs, modules and data structures, or a subset thereof:
- a board support package 533 for supporting the computer system controller 518 hardware platform;
- an operating system 534 that includes procedures for handling various basic system services and for performing hardware dependent tasks;
- a communication module 536 that is used for connecting the charge spot 106 to other computers via the one or more communication network interfaces 304 (wired or wireless) and one or more communication networks, such as the Internet, other wide area networks, local area networks, metropolitan area networks, and so on;
- a user interface module 538 that receives commands from the user via the input devices 532 (or the vehicle's input devices) and generates user interface objects in the display device 530;
- a positioning module 540 that determines and/or reports the position of a charge spot 106 using an optional positioning system 560 or the geographic ID 426 from the infrastructure adapter 302 as described herein;
- a charging control module 542 that determines and reports the status of the charge spot 106 and that performs operations related to charging batteries 104 at a charge spot 106;
- an optional account module 544 that manages account information of users of vehicles;
- a remote management module 546 which allows remote control of the charge spot.

Each of the above identified elements may be stored in one or more of the previously mentioned memory devices, and corresponds to a set of instructions for performing a function described above. The set of instructions can be executed by one or more processors (e.g., the CPUs 520). The above identified modules or programs (i.e., sets of instructions) need not be implemented as separate software programs, procedures or modules, and thus various subsets of these modules may be combined or otherwise re-arranged in various embodiments. In some embodiments, memory 522 may store a subset of the modules and data structures identified above. Furthermore, memory 522 may store additional modules and data structures not described above.

For the purpose of staged deployment, in most embodiments, the external unit 304 includes at least a processing unit 520 and memory 522 which communicates with the adapter's memory 424 to obtain and store the geographic ID 426. The external unit 304 also contains a communications interface 524 which communicates with the data network 120 (FIG. 1). In some embodiments, the geographic ID 426 is used during charging to identify which charge spot 106 is transferring power. Furthermore, when the charge spot 106 fails or malfunctions, the geographic ID 426 is sent by the communications interface 520 to the data network 120 along with a request for maintenance.

In most embodiments, the external unit also contains a charging control module 542 configured to regulate the power supplied to the vehicle 102. In some embodiments, the charging control module 542 will step down the supplied power to the requirements of the vehicle. The power components of the infrastructure adapter 302 and the external unit 304 are configured to transmit high voltage and current electrical energy between the charge spot 106 and the vehicle 102. High voltage is defined as anything above one kilowatts. In some embodiments high voltage power is defined as ranging from one kilowatts to 40 kilowatts. The particular voltage and current capacities of the power components of the infrastructure adapter 302 and the external unit 304 will vary depending on the particular energy needs of the application. For instance, high performance vehicles may require a higher voltage or current carrying capacity than standard vehicles, and thus specialized high capacity charge spot 106 may be used.

FIGS. 6A-6D are pages of a multi-page flow chart representing the methods of deployment and replacement of charge spots according to some embodiments of the invention. Some portions of the flow chart encompass the method of staged deployment of an electrical charge spot system. In some embodiments, the electric charge spot system includes only one charge spot 106, while in other embodiments the electrical charge spot system includes a plurality of charge spots. Some portions of the flow chart encompass deploying various portions of the charge spots in stages. Some portions of the flow chart encompass obtaining and communicating a geographic ID for the charge spot 106. Some portions of the flow chart also encompass replacing at least a portion of the charge spots.

Figure 6A:
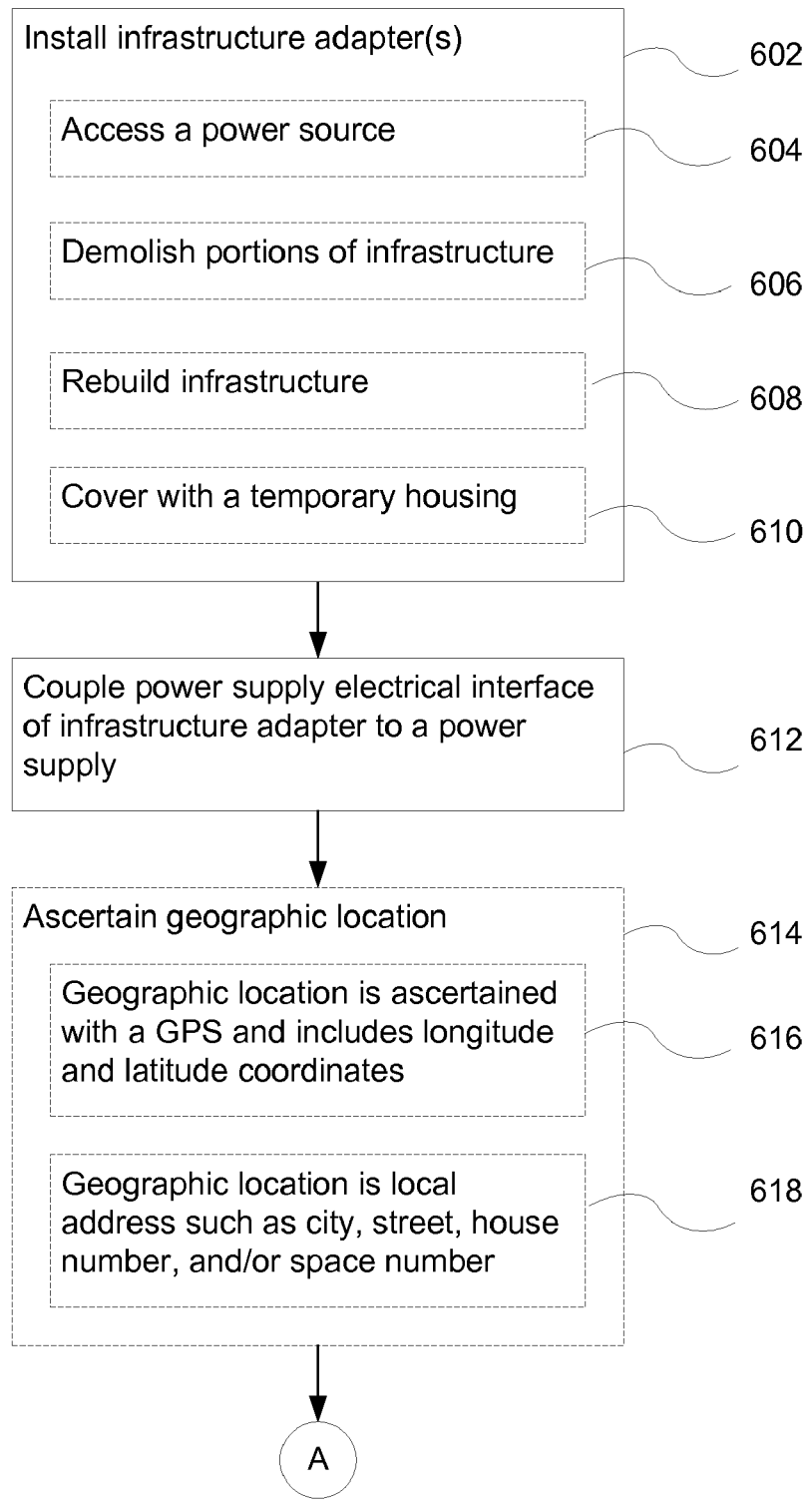
FIGS. 6A-6D are a multi-page flow chart representing the methods of deployment and replacement charge spots according to some embodiments of the invention.

As shown in FIG. 6A, one or more infrastructure adapters 302 are installed (602). In some embodiments, the installing includes accessing a power source (604). In some embodiments, the data source is also accessed when the power source is accessed. In most embodiments, this will require shutting down at least the portion of the power source where the infrastructure adapters 302 are to be installed, possibly shutting down nearby buildings as well. The installation may also involve demolition or partial demolition of a wall, floor, or ceiling (606). It may involve excavation. Installation may involve trenching to lay down power cables which may be located under a sidewalk, road, or building. The installation of the infrastructure adapter 302 may also include re-building the infrastructure (608). Rebuilding may involve patching the wall, floor, or ceiling, placing a structural foundation for the infrastructure adapter, and leveling. Thus, demolishing and rebuilding of the infrastructure are both aspects of installing the infrastructure adapters along with physically mounting or attaching the infrastructure adapter 302 to its physical location after the infrastructure adapter 302 has been connected to the power source. For example, in some embodiments, the power source and data sources are accessed, the structural foundation is placed, the power and optional communication cables are threaded through the foundation, and then the foundation is backfilled, and the infrastructure adapter is mounted in the infrastructure installation. The installing may also include covering the infrastructure adapter with a temporary housing (610). In many embodiments, the installation of the adapters is relatively time consuming and costly because accessing or deploying the power lines to the power source may be costly and time consuming. As such, in many embodiments, once the power source has been accessed, a plurality of infrastructure adapters 302 is installed. In some embodiments, the adapters are overbuilt, i.e., more infrastructure adapters 302 are installed during the initial installing stage than are immediately required. In this way, the infrastructure adapters 302 will already be in place when the demand for charge spots increases. The specifics of this are explained below. It should be noted that because more infrastructure adapters 302 are installed than are required, the infrastructure adapters 302 are relatively inexpensive, as compared to the external unit 304 portion of the charge spots. This helps reduce the cost of initial deployment.

Once the power source is accessed, the infrastructure adapter 302 is coupled to it (612). Specifically, the power supply electrical interface 402 of the infrastructure adapter 302 is coupled to the power supply. In some embodiments, the coupling further includes testing the infrastructure adapter to make sure it is working properly.

Figure 6B:
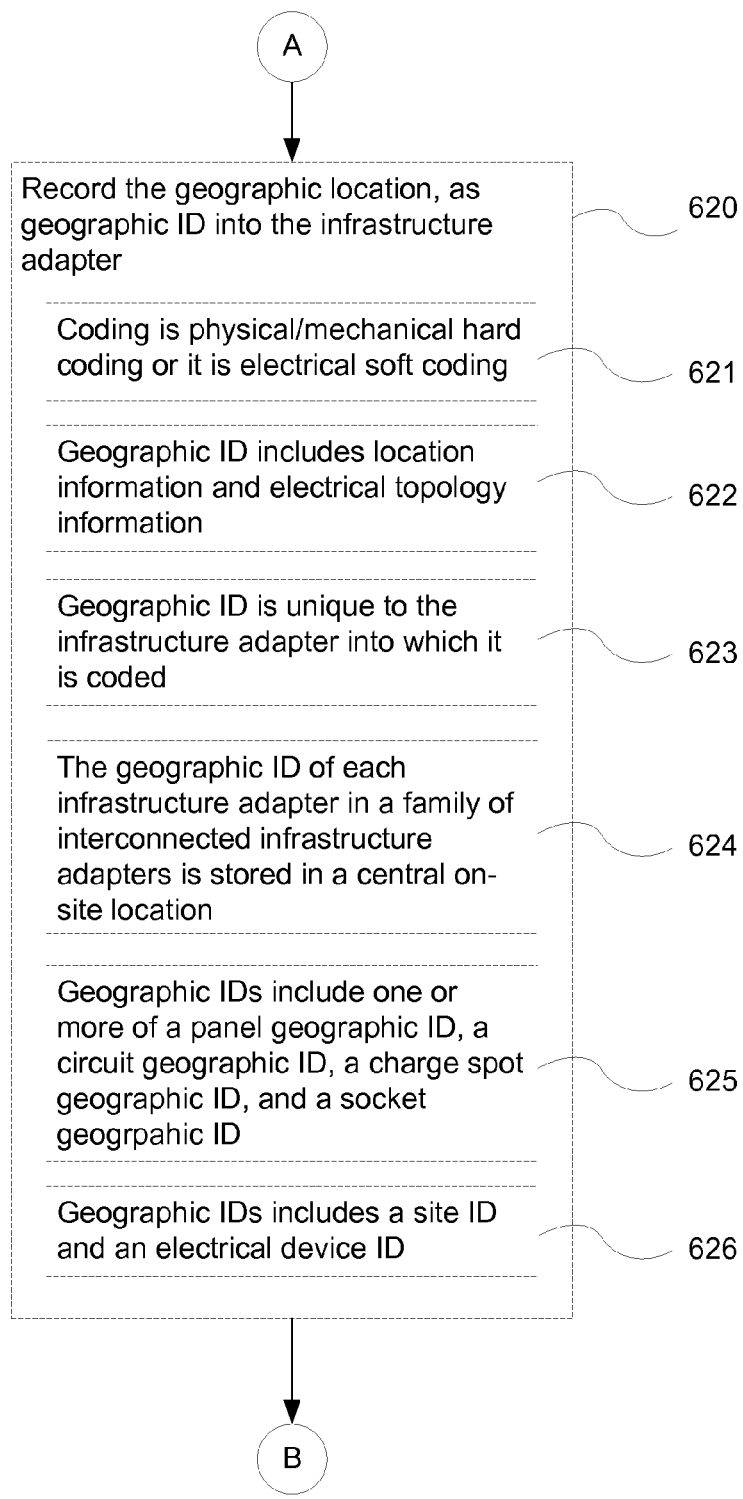

In some embodiments, the geographic location of the infrastructure adapter 302 is obtained (614). The geographic location may be obtained in a variety of ways. For example, it may be pre-assigned or it may be determined using a global positioning system device. In some embodiments, the geographic location is ascertained with a GPS used by a skilled operator at the time of installation, and includes longitude and latitude coordinates (616). In some embodiments, the geographic location is one or more of a local city, street, house number, or space number, a mile marker number (618). As shown in FIG. 6B, in some embodiments, the geographic location is recorded into the infrastructure adapter as a geographic ID (620). In some embodiments, the geographic ID is hard coded while in other embodiments it is soft coded into the infrastructure adapter (621). In some embodiments, the geographic ID includes a variety of information besides just location. In some embodiments the geographic ID includes electrical topology information (622), such as the number of charge spots at a particular location, the sequential number of the charge spot at that location, the power supply offered at that location, etc. Electrical topology information can be used for grid management, maintenance, and unique charge spot (or outlet) identification.

In some embodiments, the geographic ID is unique to the infrastructure adapter 302 into which it is coded (623). In some embodiments, the geographic ID is stored in the memory of the infrastructure adapter. In some embodiments, the geographic IDs of each infrastructure adapter in a family of interconnected infrastructure adapters 302 are stored in a central on-site location (624). For example, memory (i.e., a location controller) associated with a respective infrastructure adapter 302 may be used by a plurality of infrastructure adapters 302 that are all located near each other such as in the same row of parking spaces or on the same floor of a parking structure. In some embodiments, some geographic ID information is stored in the location controller while other geographic ID information is stored in the infrastructure adapter's device memory. In some embodiments, a variety of geographic IDs is stored for particular elements of the infrastructure adapter or family of adapters. In some embodiments, geographic IDs include one or more of a panel geographic ID, a circuit geographic ID, a charge spot geographic ID, and a socket geographic ID (625). In some embodiments the panel geographic ID and circuit geographic ID is stored in the location controller while the charge spot geographic ID and socket geographic ID is stored in the charge spot.

Figure 6C:
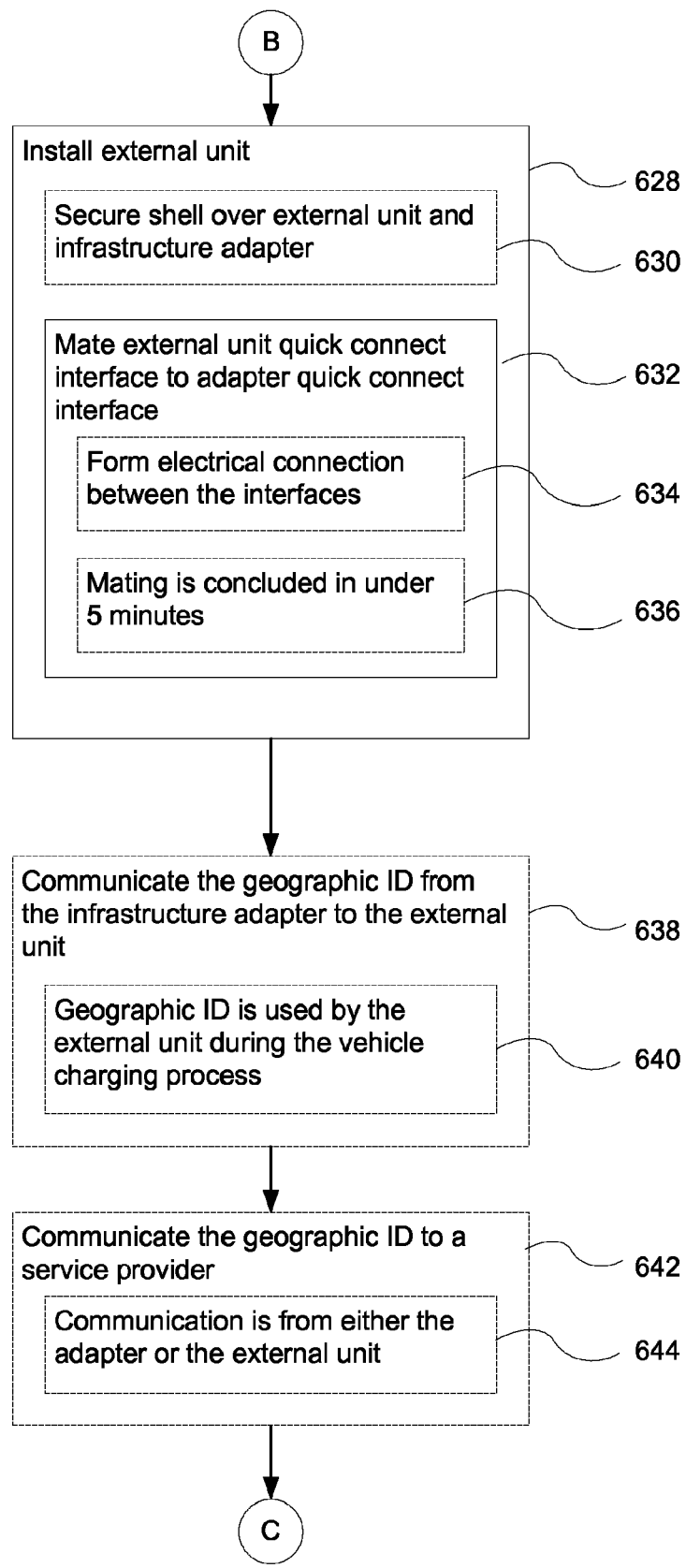

In some embodiments, the geographic ID is broken into two types: site ID which is geographical, and electrical device ID which is topological (626). In some embodiments, the site ID includes one or more of the following: Country (Country code according to International subscriber dialing codes); Region (such as state or territory): Sub-region 1 (such as city); Sub-region 2 (such as city district); and site number (specific to the site or building address.) In some embodiments the electrical device ID includes one or more of the following: Panel number, circuit number, charge station number (identifying the particular charge station); and outlet number (used when a charge station has a plurality of charging interfaces to charge more than one vehicle simultaneously). As such Panel: Country-Region-Subregion1-Subregion2-Site-Number-Panel Circuit: Country-Region-Subregion1-Subregion2-Site-Number-Panel-Circuit CS: Country-Region-Subregion1-Subregion2-SiteNumber-Panel-Circuit-Charge Spot Socket: Country-Region-Subregion1-Subregion2-Site-Number-Panel-Circuit-Charge Spot-Socket As shown in FIG. 6C, during a second stage, the external unit 304 is installed (628). The installation may be performed by a different and likely less skilled operator than the operator that installed the infrastructure adapter. The installing may include physically securing a shell over the external unit 304 and the infrastructure adapter (630). For example, in some embodiments, the shell is secured to a wall, floor, or ceiling, or to the base of an infrastructure adapter 302 by means of one or more fasteners as discussed with respect to FIG. 2. The installing also includes mating the external unit quick connect interface 502 to the adapter quick connect interface 416 (632). (It should be noted, that in most embodiments the quick connectors are mated prior to securing the shell.) As such, the external unit 304 is removably coupled to the infrastructure adapter. The mating forms an electrical connection between the external unit quick connect interface 502 and the adapter quick connect interface (634). In most embodiments, these interfaces are standard such that any external unit 304, regardless of shape, can be coupled to nearly any infrastructure adapter. In most embodiments, the mating can be completed quickly because the interfaces are standard and are designed to fit together quickly and easily. For example, in some embodiments, the only tool required is a screwdriver. Furthermore, in some embodiments the mating requires only lifting the external unit 304 into position above the infrastructure adapter and then sliding the external unit's quick connect interface into the adapter's quick connect interface. No wiring is required to mate the two pieces together. In some embodiments, the mating is concluded in under 5 minutes (636). Furthermore, the skill level required for installing the external unit 304 is relatively low. Thus, the cost of installation is also low because a skilled operator is not necessary. In some embodiments the installing of the external unit further includes testing the external unit to make sure it is working properly.

In some embodiments, after the external unit 304 has been installed, the geographic ID is communicated from the infrastructure adapter 302 to the external unit (638). In some embodiments, the geographic ID is stored in memory located in the external unit 304. In some embodiments, the geographic ID is used by the external unit 304 during the vehicle charging process (640). For example, the geographic ID may be communicated to the vehicle so that the vehicle can communicate the geographic ID to the service provider. In some embodiments, the geographic ID is also communicated to the data network 120 either via the vehicle or directly from the infrastructure adapter. In some embodiments, the service provider tracks which charge spots and for charge spots with multiple charging interfaces, which charging interface 206 on the charge spot are providing power.

As shown in 6C, the geographic ID is communicated to the service provider (642). In some embodiments, other information is also passed to the service provider, such as charge information associated with power that is flowing from the charge spot 106 to a vehicle. In some embodiments, the geographic ID is communicated directly from the infrastructure adapter, while in other embodiments it is communicated by the external unit 304, or through the vehicle (644).

Figure 6D:
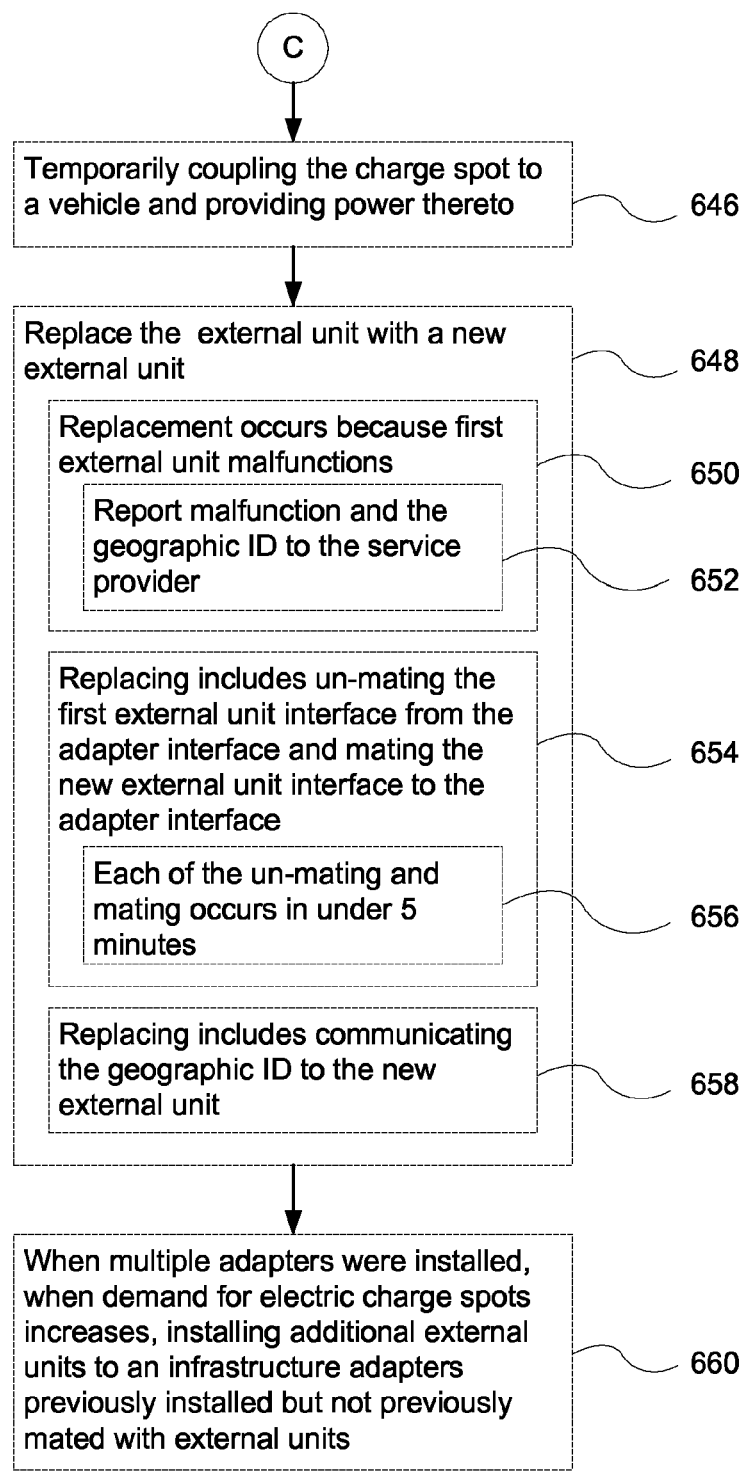

As shown in FIG. 6D, in some embodiments, the method continues with providing power from the power source to the vehicle through the charge spot (646). Specifically, the vehicle is temporarily coupled to vehicle charging interface 206 of the car electrical connector 514. Then power is enabled such that it flows from the power supply to the vehicle through the power supply electrical interface 402, the adapter quick connect interface 416, the external unit quick connect interface 502, and the car electrical connector 514. A more detailed explanation of the charging of an electric vehicle by a charge spot 106 is discussed in application Ser. No. 12/560,337 herein incorporated by reference in its entirety.

In some embodiments, an external unit 304 is replaced with a new external unit (648). In some embodiments the new external unit is installed to upgrade the unit. For example, new development in the field or upgraded standards may be the reason that a new external unit is installed. In some embodiments, the replacement is initiated because the original external unit 304 malfunctions (650). In some embodiments, when the external unit malfunctions, the external unit 304 or the infrastructure adapter 302 reports the malfunction and the geographic ID of the charge spot 106 to the service provider (652). As such, the service provider knows exactly which charge spot 106 requires maintenance. In some embodiments, the replacing includes decoupling the external unit quick connect interface 502 of the respective external unit 304 from the adapter quick connect interface 416 of the respective infrastructure adapter, and removably coupling an external unit quick connect interface 502 of the new external unit 304 to the adapter quick connect interface 416 of the respective infrastructure adapter (654). In some embodiments, each of the decoupling and coupling of the replacement take place in under 5 minutes (656). In some embodiments, the decoupling and re-coupling can happen quickly because the only tool required is a screwdriver. Furthermore, in some embodiments the decoupling requires only removing the charge spot shell and lifting the external unit 304 then sliding the external unit's quick connect interface out of the adapter's quick connect interface. It should be noted that other steps may be involved in the replacement, such as taking off the shell of the external case. These other steps are not included in the 5 minutes noted for the de-coupling and coupling. In some embodiments, the replacing also includes communicating the geographic ID (likely stored or hard coded into the infrastructure adapter 302) to the new external unit (658). Because of the ease of de-coupling an old external unit 304 and coupling a new external unit 304 to the infrastructure adapter, the cost of maintenance is kept low. Specifically, an operator with special skill is not required for the replacement. The malfunctioning external unit 304 can be taken back to a central location where a skilled operator can in some cases fix and refurbish it for future use.

In some embodiments, when demand for electrical charge spots increases more external units 304 are installed to already installed infrastructure adapters (660). Specifically, additional external units 304 are installed by removably coupling the additional external unit quick connect interfaces 502 of the additional external units 304 to adapter quick connect interfaces 416 of previously unused infrastructure adapters. The installing of additional external units does not interfere with the operation of the charge spots already in operation. As such, the electrical charge spot 106 system is designed for staged deployment that is easy to scale. The scaling can be done over a period of time as demand for charge spots increases. By installing more, relatively inexpensive infrastructure adapters 302 during the infrastructure installation, the underlying infrastructure such as the street or building holding the parking spots need only be disturbed once. Then the external units 304, are not installed until demand requires them. As the external units 304 are the more complex and thus more expensive portion of the charge spot 106, the cost of deployment also scales with demand.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of staged deployment of an electrical charge spot system for charging at least partially electric vehicles, comprising:
   during a first stage:
      installing one or more infrastructure adapters, each infrastructure adapter comprising a power supply electrical interface and an adapter quick connect interface;
      coupling the power supply electrical interface of the infrastructure adapter to a power supply;

during a second stage:
installing one or more external units, each external unit comprising a car electrical connector, configured to temporarily electrically connect to and charge an at least partially electric vehicle, and an external unit quick connect interface, configured to removably mate to the adapter quick connect interface; and mating an external unit quick connect interface of a respective external unit of the one or more external units to an adapter quick connect interface of a respective infrastructure adapter of the one or more infrastructure adapters.

2. The method of claim 1, wherein each infrastructure adapter further comprises a data connector and an adapter data interface and each external unit further comprises an external unit data interface, the method further comprising:
during the first stage:
coupling the data connector of the infrastructure adapter to a data network; and
during the second stage:
wherein the mating further comprises mating an external unit data interface of a respective external unit of the one or more external units to an adapter data interface of a respective infrastructure adapter of the one or more infrastructure adapters.

3. The method of claim 1, wherein the mating forms a high voltage power supply electrical connection between the respective external unit quick connect interface and the respective adapter quick connect interface.

4. The method of claim 1, further comprising:
during the first stage:
ascertaining a unique geographic location for the respective infrastructure adapter; and
recording the unique geographic location comprising at least a portion of a geographic ID in a memory associated with the respective infrastructure adapter; and
during the second stage:
communicating the unique geographic ID from the infrastructure adapter to the respective external unit.

5. The method of claim 4, further comprising: communicating the unique geographic ID to a service provider.

6. The method of claim 4, further comprising: communicating the unique geographic ID to an at least partially electric vehicle.

7. The method of claim 4, wherein the geographic ID further includes electrical topology identification information.

8. The method of claim 1, further comprising:
during a third stage:
temporarily coupling a vehicle charging interface portion of the car electrical connector to an at least partially electric vehicle; and
enabling power to flow from the power supply to the at least partially electric vehicle through the power supply electrical interface, the adapter quick connect interface, the external unit quick connect interface, and the car electrical connector.

9. The method of claim 8, further comprising:
during the third stage:
communicating charging information associated with the power flowing from the power supply to the electric vehicle, from the charge spot system to a service provider, via the power supply electrical interface.

10. The method of claim 8, further comprising:
during the third stage:
communicating charging information associated with the power flowing from the power supply to the electric vehicle, from the charge spot system to a service provider, via a wireless communication device in the charge spot system.

11. The method of claim 1, further comprising:
during a third stage:
replacing the respective external unit with a new external unit, by:
decoupling the external unit quick connect interface of the respective external unit from the adapter quick connect interface of the respective infrastructure adapter; and
removably coupling an external unit quick connect interface of the new external unit to the adapter quick connect interface of the respective infrastructure adapter.

12. The method of claim 11, further comprising:
during the third stage:
communicating a unique geographic ID from the infrastructure adapter to the new external unit.

13. The method of claim 1, further comprising:
during a third stage, installing one or more additional external units by:
removably coupling one or more external unit quick connect interfaces of the one or more additional external units to one or more adapter quick connect interfaces of previously unused infrastructure adapters of the one or more infrastructure adapters.

14. The method of claim 1, wherein the second stage installing includes installing a charge spot shell.

15. The method of claim 1, wherein the first stage installing includes covering the infrastructure adapter with a temporary housing.

16. An electrical charge spot system comprising one or more charge spots for charging an at least partially electric vehicle, wherein at least one charge spot comprises:
an infrastructure adapter configured to removably connect to an external unit, the infrastructure adaptor comprising:
a memory storing information related to the geographic location of the infrastructure adapter;
an adapter quick connect interface comprising:
power connectors;
data connectors; and
a signaling interface configured to communicate the information to the external unit and
a power supply electrical interface electrically coupled to the power connectors and configured to be coupled to an external power supply;
a data connector electrically coupled to the data connectors and configured to be coupled to a data network, and
the external unit comprising:
an external unit quick connect interface configured to removably connect to the adapter quick connect interface;
a car electrical connector electrically coupled to the external unit quick connect interface and configured to temporarily connect to and charge an at least partially electric vehicle.

17. The electrical charge spot system of claim 16, wherein the infrastructure adapter is configured to be coupled to the power supply according to location specific requirements of an infrastructure; and
the external unit is generic and is configured to couple to the infrastructure adapter without regard to the specific power supply requirements of the infrastructure.

18. The electrical charge spot system of claim 16, wherein the infrastructure adapter further comprises:
- an adapter guide mechanism; and
- an adapter tolerance mechanism; and the external unit further comprises:
- an external unit guide mechanism; and
- an external unit tolerance mechanism.

19. The electrical charge spot system of claim 16, wherein the external unit further comprises a computer system controller electrically coupled to the external unit quick connect interface and the car electrical connector to control charging of an at least partially electric vehicle.

20. An electrical charge spot system comprising one or more charge spots for charging an at least partially electric vehicle, wherein at least one charge spot comprises:
- an infrastructure adapter comprising:
  - a means for removably mating to an external unit; and
  - a means for coupling to a power supply; and
- an external unit comprising:
  - a means for temporarily connecting to and charging an at least partially electric vehicle; and
  - a means for removably mating to the infrastructure adapter.

* * * * *